United States Patent
Nestoriuc

(10) Patent No.: US 10,012,116 B2
(45) Date of Patent: Jul. 3, 2018

(54) METHOD AND ASSEMBLY FOR MONITORING AN ACTUATOR DEVICE

(71) Applicant: AVL LIST GMBH, Graz (AT)

(72) Inventor: Max Nestoriuc, Munich (DE)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 15/032,110

(22) PCT Filed: Oct. 30, 2014

(86) PCT No.: PCT/EP2014/073287
§ 371 (c)(1),
(2) Date: May 17, 2016

(87) PCT Pub. No.: WO2015/063197
PCT Pub. Date: May 7, 2015

(65) Prior Publication Data
US 2016/0298507 A1 Oct. 13, 2016

(30) Foreign Application Priority Data
Oct. 30, 2013 (DE) .......................... 10 2013 018 263

(51) Int. Cl.
*F01L 13/00* (2006.01)
*F02D 41/26* (2006.01)
*G01B 7/30* (2006.01)

(52) U.S. Cl.
CPC ....... *F01L 13/0015* (2013.01); *F01L 13/0036* (2013.01); *F02D 41/26* (2013.01);
(Continued)

(58) Field of Classification Search
CPC ............... F01L 13/0015; F01L 13/0036; F01L 2013/0078; F01L 2820/031;
(Continued)

(56) References Cited

U.S. PATENT DOCUMENTS 8,161,930 B2 * 4/2012 Elendt ..................... F01L 1/047
123/90.16
8,365,692 B2 * 2/2013 Schoeneberg .......... F01L 1/047
123/90.15
(Continued)

FOREIGN PATENT DOCUMENTS

CN 102171420 8/2011
CN 102282341 12/2011
(Continued)

OTHER PUBLICATIONS

International Search Report prepared by the European Patent Office dated Apr. 24, 2015, for International Application No. PCT/EP2014/073287.
(Continued)

*Primary Examiner* — Joseph Dallo
(74) *Attorney, Agent, or Firm* — Sheridan Ross P.C.

(57) ABSTRACT

A method for monitoring an actuator device of a reciprocating piston engine, wherein the actuator device is designed to actuate, particularly reversibly displace, a sliding cam device of the reciprocating piston engine, particularly substantially parallel to a camshaft of the reciprocating piston engine, with the steps S1 Feeding of actuation energy to the actuator device, whereupon the actuator device undergoes a first state change, S2 Monitoring of the actuator device and detection of a second state change of the actuator device, S3 Determining of a first angle of rotation α of a camshaft or of the camshaft of the reciprocating piston engine on the basis of the second state change.

18 Claims, 9 Drawing Sheets

Figure 1:
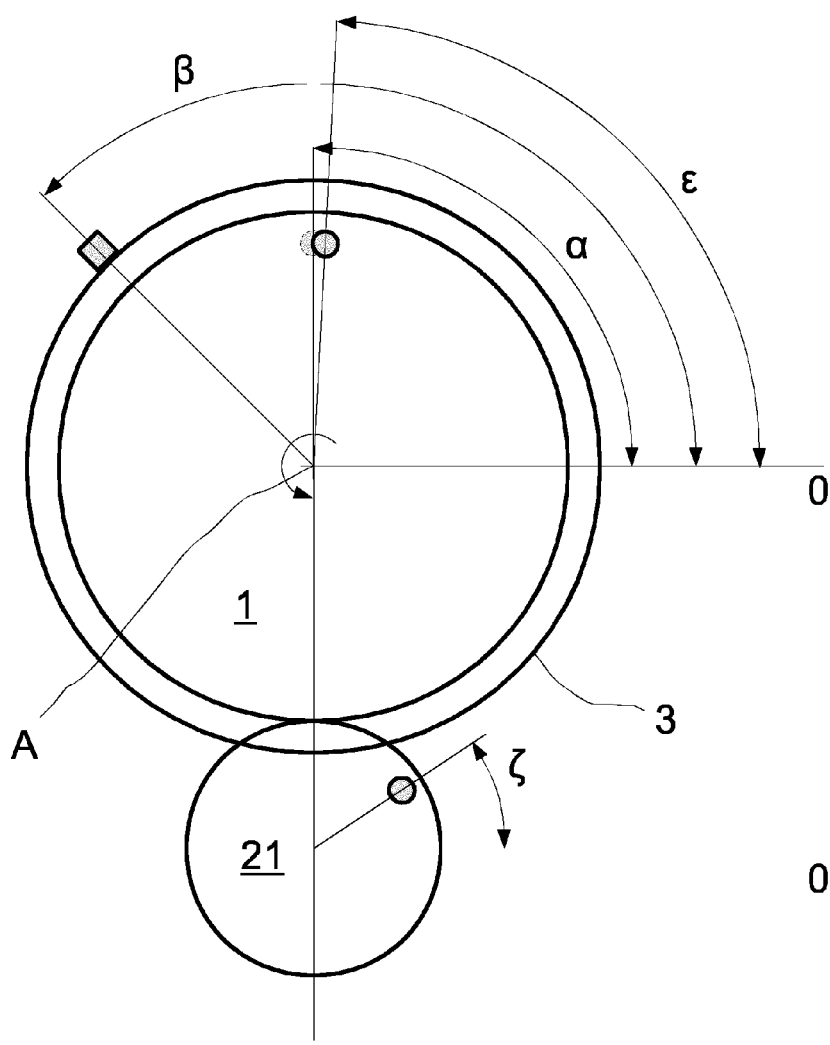

(52) U.S. Cl.
CPC ........ *G01B 7/30* (2013.01); *F01L 2013/0052* (2013.01); *F01L 2013/0078* (2013.01); *F01L 2820/031* (2013.01); *F01L 2820/041* (2013.01)

(58) Field of Classification Search
CPC ........ F01L 2820/041; F01L 2013/0052; G01B 7/30; F02D 41/26
See application file for complete search history.

(56) References Cited

U.S. PATENT DOCUMENTS

| | | | | |
|---|---|---|---|---|
| 8,474,421 | B2* | 7/2013 | Gregor | F01L 13/0036 123/90.11 |
| 8,584,639 | B2* | 11/2013 | Elendt | F01L 13/0036 123/90.18 |
| 9,046,012 | B2* | 6/2015 | Yano | F01L 1/34 123/90.15 |
| 9,074,496 | B2* | 7/2015 | Schuler | F01L 13/0036 |
| 2010/0242880 | A1* | 9/2010 | Watanabe | F01L 1/344 123/90.17 |
| 2011/0061616 | A1* | 3/2011 | Watanabe | F01L 1/02 123/90.15 |
| 2013/0276564 | A1 | 10/2013 | Popp et al. | |
| 2014/0283771 | A1* | 9/2014 | Mukaide | F01L 13/0031 123/90.15 |

FOREIGN PATENT DOCUMENTS

| | | |
|---|---|---|
| DE | 10 2008 024086 A1 | 11/2009 |
| DE | 102008024086 | 11/2009 |
| DE | 20 2009 015465 U1 | 2/2010 |
| DE | 10 2008 054254 A1 | 5/2010 |
| DE | 102008054254 | 5/2010 |
| DE | 10 2007 010149 A1 | 5/2012 |
| DE | 10 2011 003760 A1 | 5/2012 |
| DE | 102007010149 | 5/2012 |
| DE | 102011003760 | 5/2012 |
| DE | 10 2010 053359 A1 | 6/2012 |
| DE | 102010053359 | 6/2012 |
| DE | 10 2011 088298 A1 | 6/2013 |
| DE | 102011088298 | 6/2013 |
| DE | 10 2013 206016 A1 | 10/2013 |
| DE | 102013206016 | 10/2013 |
| DE | 102012012064 | 12/2013 |
| WO | WO 2012/152456 A1 | 11/2012 |

OTHER PUBLICATIONS

International Preliminary Report on Patentability for International (PCT) Patent Application No. PCT/EP2014/073287, dated May 12, 2016, 8 pages.
Official Action for China Patent Application No. 201480059954.8, dated Nov. 27, 2017, 6 pages.

* cited by examiner

METHOD AND ASSEMBLY FOR MONITORING AN ACTUATOR DEVICE

CROSS REFERENCE TO RELATED APPLICATIONS

This application is a national stage application under 35 U.S.C. 371 and claims the benefit of PCT Application No. PCT/EP2014/073287 having an international filing date of 30 Oct. 2014, which designated the United States, which PCT application claimed the benefit of German Patent Application No. 10 2013 018 263.8 filed 30 Oct. 2013, the disclosure of each of which are incorporated herein by reference in their entirety.

The invention relates to a method and a device for monitoring an actuator device. The invention is described in connection with reciprocating piston engines of motor vehicles.

Reciprocating piston engines can be operated according to one or more known cyclic processes and combustion processes. A cyclic process is associated with certain advantages and disadvantages, particularly the degree of exploitation of the fuel that is fed in (cost-effectiveness), the power that can be made available by the reciprocating piston engine, and the amount of pollutants produced. Two different such cyclic processes can require different valve lift curves for the charge cycle. Essential elements of a valve lift curve of a given intake or exhaust valve (valve) are its opening/closing point (control times) and its valve travel. Using an actuator device, the charge cycle can be influenced by selecting one of several different valve lift curves for at least one valve, particularly as a function of the speed of the reciprocating piston engine or the gas pedal position.

It is generally perceived as very problematic if a reciprocating piston engine is operated uneconomically for extended operating intervals.

It is the object of the present invention to enable more economical operation of a reciprocating piston engine.

The object is achieved by a method for monitoring an actuator device according to claim 1. Claim 7 describes a commensurate arrangement for monitoring an actuator device. Preferred developments of the invention are the subject matter of the subclaims.

The method according to the first aspect of the invention is used to monitor an actuator device of a reciprocating piston engine. The actuator device is designed to actuate, particularly reversibly displace, a sliding cam device of the reciprocating piston engine, particularly substantially parallel to a camshaft of the reciprocating piston engine. The method has the following steps:

S1 Feeding of actuation energy to the actuator device, whereupon the actuator device undergoes a first state change, S2 Monitoring of the actuator device and detection of a second state change of the actuator device, S3 Determining of a first angle of rotation $\alpha$ of a camshaft or of the camshaft of the reciprocating piston engine on the basis of the second state change.

Preferably, the first state change of the actuator device consists in its change of position, particularly in its rotation and/or translation. Preferably, the first state change of the actuator device initiates a reversible displacement of the sliding cam device, particularly substantially parallel to a camshaft.

Preferably, during step S3 with a minimum change of position $\Delta x$, particularly rotation and/or translation, of the actuator device, it is assumed that a certain first angle of rotation $\alpha$ of the camshaft is present.

Preferably, the second state change is initiated by the sliding cam device, particularly by a peripheral extension portion of the sliding cam device.

To achieve the advantages of a certain cyclic process or combustion process, it is especially important that the valve lift curves, particularly the control times thereof, be adhered to. It has been observed that the consumption of a reciprocating piston engine is increased, that is, that the operation thereof is less economical, in the event of a deviation from the required or intended control times.

It is common practice to actuate a valve with a valve drive. A valve drive can have as components a camshaft, a cam follower, a valve-clearance compensation element, and a sliding cam device, which bears at least one eccentric cam and is slidable substantially parallel to the rotational axis of the camshaft, it being possible for the sliding cam device to be caused to rotate by the camshaft. A second angle marking can be fastened in a torsion-proof manner to the camshaft and detected by a sensor for the angle of rotation of the camshaft. During the operation of the reciprocating piston engine, it is possible, on the basis of the detected second angle marking and the assumed or graphic geometries of the components of the valve drive, to determine at least one control time of a valve, for example the beginning of the opening of the valve.

However, this valve drive and its components have unavoidable tolerances from the manufacturing process (manufacturing tolerances) and from the operation of the reciprocating piston engine that may be necessary for the proper functioning of the valve drive. As a result, unknown time differences can occur between the control times of a valve that are expected based on the detected second angle marking and the actual control times. It has been observed that tolerances of the component (component tolerances) can combine to bring about a noticeable deviation of the actual control times from the required or intended control times.

With the method according to the first aspect, the first angle of rotation $\alpha$ of a camshaft or of the camshaft can be detected on the basis of the second state change of the actuator device. Preferably, the second state change of the actuator device is initiated by the sliding cam device.

With the method according to the first aspect, the first angle of rotation $\alpha$ of a camshaft or of the camshaft can be detected with greater accuracy and the resolution of the rotation angle detection can be increased.

In particular, with the method according to the first aspect, a tolerance error in the rotation angle detection can be identified and, particularly, corrected.

A closer mechanical interrelation exists between the state changes or movements of the actuator device and the movements of the associated valve than between the movements of the valve and of the second angle marking of the camshaft. The first angle of rotation $\alpha$ can be determined with greater accuracy with the method according to the invention than through detection of the second angle marking of the camshaft, particularly if several component tolerances have a less pronounced impact. Preferably, tolerances of the camshaft and of its second angle marking can be eliminated. As a result, required or intended control times can be better adhered to and the underlying object achieved. To wit, in certain combustion processes, such as the Miller cycle, for example, a two to three percent tolerance in the determination of the position of the eccentric cam leads to a significant charge difference of the piston of up to 30%— depending on the respective operating point—and to poorer mixture preparation, errors in the charge cycle, and consumption drawbacks.

In terms of the invention, an actuator device is to be understood as a device that is used particularly to actuate a sliding cam device of the reciprocating piston engine, particularly for the reversible displacement of the sliding cam device, particularly substantially parallel to a camshaft of the reciprocating piston engine. The actuator device is designed to exert a force component on the sliding cam device from time to time substantially parallel to the camshaft of the reciprocating piston engine. Through the application of the force component, the sliding cam device can be reversibly displaced substantially parallel to the camshaft. The actuator device is designed to be displaced or moved with respect to a second longitudinal axis B. Preferably, the actuator device is designed to rotate about the second longitudinal axis B and/or to move translationally substantially parallel to the second longitudinal axis B.

Preferably, the actuator device is embodied with a machine element, especially preferably with a pin, bolt, pin-shaped portion, finger or rotating lever. Preferably, the actuator device is embodied with a metal. Preferably, the actuator device has a wear-reducing or friction-reducing coating in some portions.

A state change of the actuator device is to be understood in terms of the invention particularly as a displacement, positional change or movement of the actuator device, preferably in relation to the second longitudinal axis B. During the operation of the reciprocating piston engine, the actuator device repeatedly undergoes state changes, particularly for the purpose of actuating or displacing the sliding cam device, particularly initiated by the sliding cam device. To initiate the first state change, kinetic energy is fed to the actuator device. Preferably, a displacement of the sliding cam device can initiate the first state change. Preferably, in order to initiate the second state change, a force component that is outwardly directed and radial to the rotational axis A of the camshaft is applied by the sliding cam device to the actuator device.

In terms of the invention, a sliding cam device is to be understood as a device that
  is used particularly for the at least indirect actuation or opening of at least one intake or exhaust valve (valve) of the reciprocating piston engine, and/or
  is used particularly for the at least indirect loading of the valve with a force component in the direction of an associated combustion chamber of the reciprocating piston engine or along a valve shaft, and/or
  is used particularly for the temporary loading of the actuator device with a force that is outwardly directed and radial to the rotational axis of the camshaft, and/or
  is used particularly for initiating the second state change of the actuator device.

The sliding cam device is designed to rotate at least intermittently with the camshaft. The sliding cam device is designed to be reversibly displaced or slid along the camshaft or its rotational axis. The sliding cam device has at least one or two cams on an outer surface or circumferential surface that are used for the at least indirect actuation of the valve or the indirect loading of the valve with the force component. Preferably, the sliding cam device has two such cams that can effect different valve lift curves.

Preferably, the sliding cam device has a substantially cylindrical shape with an interior space, the camshaft being capable of extending through this interior space. Especially preferably, the sliding cam device has in its interior space a coupling element for connecting in a frictional or form-fitting manner to the camshaft.

Preferably, the sliding cam device has at least one portion on a circumferential surface, preferably at least one peripheral extension portion, that is used for the occasional loading of the actuator device with a force component that is outwardly directed and radial to the rotational axis. The peripheral extension portion is used for the temporary loading of the actuator device with a force that is outwardly directed and radial to the rotational axis A of the camshaft. The peripheral extension portion is arranged on a circumferential surface of the sliding cam device. Preferably, the peripheral extension portion is embodied with an ascending flank or ramp, the flank being capable of forcing the actuator device away from the rotational axis A. Especially preferably, the flank or ramp transitions uniformly or continuously in the circumferential direction into the remaining circumferential surface.

Preferably, the sliding cam device has a first angle marking that can be detected by a sensor, which can be used to detect the second angle of rotation $\beta$. Especially preferably, the first angle marking is arranged on a circumferential surface or front face of the sliding cam device.

In terms of the invention, a camshaft is to be understood as a device that is used particularly at least indirectly for the actuation of at least one of the valves of the reciprocating piston engine, which is used particularly for guiding and driving the sliding cam device. The camshaft can rotate about its rotational axis A, the camshaft preferably being aligned substantially parallel to the crankshaft of the reciprocating piston engine. The camshaft can be driven at least indirectly by the crankshaft. Preferably, the camshaft has a second angle marking that can be detected by a sensor and can indicate the angle of rotation of the camshaft (first angle of rotation $\alpha$). Preferably, the camshaft has on a circumferential surface at least one coupling element for connecting in a frictional and/or form-fitting matter to the sliding cam device, the coupling element being used particularly for driving the sliding cam device, and the coupling element being used particularly to guide the sliding cam device during its displacement of the rotational axis.

In terms of the invention, the second angle of rotation $\beta$ is a measure for the position and rotation of the sliding cam device about the rotational axis A of the camshaft. Preferably, the second angle of rotation $\beta$ is correlated with a beam 0 (zero beam), which is aligned substantially perpendicularly to the rotational axis A. Here, the second angle of rotation $\beta$ is determined in relation to the zero beam on the basis of the second state change.

In terms of the invention, the first angle of rotation $\alpha$ is a measure for the position and rotation of the camshaft about its rotational axis A. Preferably, the first angle of rotation $\alpha$ is correlated with the zero beam. Here, the first angle of rotation $\alpha$ is determined in relation to the zero beam, particularly by calculation, on the basis of the second state change.

In terms of the invention, the third angle of rotation $\epsilon$ is a measure for the position and rotation of the camshaft about its rotational axis A. Preferably, the third angle of rotation $\epsilon$ is correlated with the zero beam. Here, the third angle of rotation $\epsilon$ is determined on the basis of the detected second angle marking of the camshaft. Particularly as a result of component tolerances or manufacturing tolerances, the third angle of rotation $\epsilon$ can deviate from the first angle of rotation $\alpha$ of the same camshaft.

In terms of the invention, the fourth angle of rotation $\zeta$ is a measure for the position and rotation of the crankshaft about its rotational axis. Preferably, the fourth angle of rotation $\zeta$ is correlated with a beam that is arranged substantially parallel to the zero beam.

The differential angles $\gamma_1$, $\gamma_2$, $\gamma_3$ are each calculated with differences from two of the aforementioned angles of rotation.

In terms of the invention, the position x is to be understood as a measure for a certain position of the actuator device. The position x can refer to a distance or to an angle in relation to a reference, particularly depending on whether the actuator device is designed to move rotationally or translationally in relation to the second longitudinal axis B.

A predetermined change of position $\Delta x$ is to be understood in terms of the invention as a minimum positional change of the actuator device, which is understood as the second state change of the actuator device. Insofar as the actuator device is designed to move translationally in relation to the second longitudinal axis B, a minimum path is understood as the second state change. Insofar as the actuator device is designed to rotate in relation to the second longitudinal axis B, a minimum angle is understood as the second state change. Preferably, the predetermined change of position $\Delta x$ is a few millimeters or a few degrees [°] or only fractions thereof.

According to a preferred development, the actuation energy is fed electromagnetically, inductively or electrostatically. This preferred development can particularly offer the advantage that the movement through the first state change can be initiated in a contactless manner. This preferred development can particularly offer the advantage that the control for moving through the first state change can be done electrically. This preferred development can particularly offer the advantage that the initiation of the first state change can occur with reduced wear.

According to a preferred development, which can be advantageously combined with one of the abovementioned developments, the second state change is detected electromagnetically, inductively, electrostatically, capacitatively or optoelectronically. This preferred development can particularly offer the advantage that the second state change can be detected with reduced wear. This preferred development can particularly offer the advantage that the event of the second state change can be further processed by electronic means.

According to a preferred development, which can be advantageously combined with one of the abovementioned developments, the second state change is detected by means of a change of position, particularly a translation or a rotation, particularly in relation to a second longitudinal axis B, of the actuator device. Preferably, a minimum or predetermined change of position of the actuator device is processed or understood as its second state change. This preferred development can particularly offer the advantage that the second state change can be detected with a distance measurement device or angle measuring device. This preferred development can particularly offer the advantage that the event of the second state change can be further processed by electronic means.

According to a preferred development, which can be advantageously combined with one of the abovementioned developments, the first angle of rotation $\alpha$ is determined on the basis of a predetermined change of position $\Delta x$ or minimum change of position of the actuator device. This preferred development can particularly offer the advantage that small, simple and/or economical sensors can be used to detect the second state change.

A preferred development, which can be advantageously combined with one of the abovementioned developments, has the following steps:

S4 Determining of a second angle of rotation $\beta$ of the sliding cam device on the basis of the second state change or on the basis of the—particularly predetermined—change of position $\Delta x$ of the actuator device, particularly wherein the apex of the second angle of rotation $\beta$ lies on a rotational axis A of the camshaft, S5 Linking of the second angle of rotation $\beta$ and first angle of rotation $\alpha$ at a first differential angle $\gamma_1$.

Preferably, during step S4, with a minimum change of position $\Delta x$ of the actuator device, it is assumed that a certain second angle of rotation $\beta$ of the sliding cam device is present.

Preferably, during step S5, the difference between the second angle of rotation $\beta$ and the first angle of rotation $\alpha$ is formed.

Preferably, the first differential angle is linked with an engine-speed change $d\zeta/dt$ of the crankshaft, particularly through subtraction. Particularly in the case of decreasing or increasing speeds of the crankshaft, a relative movement between the sliding cam device and the camshaft can occur, so the first differential can fluctuate during the operation of the reciprocating piston engine.

This preferred development can particularly offer the advantage that changes in the timing of at least one of the two angles of rotation during the operation of the reciprocating piston engine can be detected. This preferred development can particularly offer the advantage that the influence of the clearance fit between sliding cam device and camshaft can be taken into account in determining the first differential angle. This preferred development can particularly offer the advantage that the first differential angle can be used as an indication of tolerances in the valve drive.

According to a preferred development, which can be advantageously combined with one of the abovementioned developments, a first angle measuring device is connected to the camshaft in a rotationally fixed manner. A combination of a second angle marking that is connected to the camshaft in a rotationally fixed manner and a sensor for detecting this second angle marking that is stationary with respect to the rotating camshaft is also regarded as a first angle measuring device in terms of the invention. The preferred development has the following steps:

S6 Detecting of a third angle of rotation $\epsilon$ of the camshaft with the first angle measuring device, S7 Linking, particularly subtracting, of the second angle of rotation $\beta$ and/or of the first angle of rotation $\alpha$ with the third angle of rotation $\epsilon$, particularly at a second differential angle $\gamma_2$.

Preferably, the second differential angle is linked with an engine-speed change $d\zeta/dt$ of the crankshaft, particularly through subtraction. Particularly in the case of decreasing or increasing speeds of the crankshaft, a relative movement between the sliding cam device and the camshaft can occur, so the second differential angle can fluctuate during the operation of the reciprocating piston engine.

This preferred development can particularly offer the advantage that changes in the timing of at least one of the angles of rotation during the operation of the reciprocating piston engine can be detected. This preferred development can particularly offer the advantage that the influence of the clearance fit between sliding cam device and camshaft can be taken into account in determining the second differential angle. This preferred development can particularly offer the advantage that the second differential angle can be used as an indication of tolerances in the valve drive. This preferred development can particularly offer the advantage that a defect of one of the sensors or of the first angle measuring device can be deduced from an unusual differential angle.

According to a preferred development, which can be advantageously combined with one of the abovementioned developments, a second angle measuring device is connected to the crankshaft of the reciprocating piston engine in a rotationally fixed manner. A combination of an angle marking that is connected to the crankshaft in a rotationally fixed manner and a sensor for detecting this angle marking that is stationary with respect to the rotating crankshaft is also regarded as a second angle measuring device in terms of the invention. The preferred development has the following steps:

S8 Detecting of a fourth angle of rotation $\zeta$ of the crankshaft with the second angle measuring device (22a), S9 Linking of the second angle of rotation $\beta$ and/or of the first angle of rotation $\alpha$ with the fourth angle of rotation $\zeta$, particularly at a third differential angle $\gamma_3$.

Preferably, the third differential angle is linked with an engine-speed change $d\zeta/dt$ of the crankshaft, particularly through subtraction. Particularly in the case of decreasing or increasing speeds of the crankshaft, a relative movement between the sliding cam device and the camshaft can occur, so the third differential angle can fluctuate during the operation of the reciprocating piston engine.

This preferred development can particularly offer the advantage that changes in the timing of at least one of the angles of rotation during the operation of the reciprocating piston engine can be detected. This preferred development can particularly offer the advantage that the influence of the clearance fit between sliding cam device and camshaft can be taken into account in determining the third differential angle. This preferred development can particularly offer the advantage that the third differential angle can be used as an indication of tolerances, particularly in the valve drive. This preferred development can particularly offer the advantage that a defect of one of the sensors or of the second angle measuring device can be deduced from an unusual differential angle.

According to a preferred development, which can be advantageously combined with one of the abovementioned developments, the camshaft has an adjustment mechanism that is designed to set an angle-of-rotation position of the camshaft relative to the crankshaft. The preferred development has the following step:

S10 Setting of the angle-of-rotation position on the basis of the first differential angle $\gamma_1$, the second differential angle $\gamma_2$, or the third differential angle $\gamma_3$.

Preferably, step S10 occurs repeatedly or intermittently during the operation of the reciprocating piston engine.

This preferred development can particularly offer the advantage that increasing wear of the valve drive can be taken into account, particularly in order to enable more economical operation of the reciprocating piston engine. This preferred development can particularly offer the advantage that it is possible to react to thermal influences on the valve drive, particularly in order to enable more economical operation of the reciprocating piston engine.

The underlying object is also achieved by a computer program containing instructions, with the instructions causing the control device to execute a method according to the first aspect of the invention or according to a preferred development when carried out by a control device.

The underlying object is also achieved by a computer-readable medium on which the aforementioned computer program is stored.

The arrangement according to the second aspect of the invention is used to monitor an actuator device of a reciprocating piston engine, particularly to execute the method according to the first aspect of the invention or to execute one of its preferred developments. The arrangement has:

a camshaft that can rotate about a rotational axis A, a sliding cam device that can be displaced substantially parallel to the rotational axis A and has a peripheral extension portion on a circumferential surface, an actuator device that is designed to actuate or displace the sliding cam device and can undergo a second state change, a second measuring device that is designed to detect the second state change and is particularly capable of determining a first angle of rotation $\alpha$ of the camshaft on the basis of the second state change, the peripheral extension portion being designed to load the actuator device with at least one force component outwardly directed and radial to the rotational axis A.

Preferably, the sliding cam device is embodied with a peripheral extension portion that is used to initiate the second state change.

To achieve the advantages of a certain cyclic process or combustion process, it is especially important that the valve lift curves, particularly the control times thereof, be adhered to. It has been observed that the consumption of a reciprocating piston engine is increased, that is, that the operation thereof is less economical, in the event of a deviation from the required or intended control times.

It is common practice to actuate a valve with a valve drive. A valve drive can have as components a camshaft, a cam follower, a valve-clearance compensation element, and a sliding cam device that bears at least one eccentric cam, is slidable substantially parallel to the rotational axis of the camshaft, and can be caused to rotate by the camshaft. A second angle marking can be fastened in a torsion-proof manner to the camshaft and detected by a sensor for the angle of rotation of the camshaft. During the operation of the reciprocating piston engine, it is possible, on the basis of the detected second angle marking and the assumed or graphic geometries of the components of the valve drive, to determine at least one control time of a valve, for example the beginning of the opening of the valve.

However, this valve drive and its components have unavoidable tolerances from the manufacturing process (manufacturing tolerances) and from the operation of the reciprocating piston engine that may be necessary for the proper functioning of the valve drive. As a result, unknown time differences can occur between the control times of a valve that are expected based on the detected second angle marking and the actual control times. It has been observed that tolerances of the component (component tolerances) can combine to bring about a noticeable deviation of the actual control times from the required or intended control times.

With the arrangement according to the second aspect, the first angle of rotation $\alpha$ of a camshaft or of the camshaft can be detected on the basis of the second state change of the actuator device. Preferably, the second state change of the actuator device is initiated by the sliding cam device.

A closer mechanical interrelation exists between the state changes or movements of the actuator device and the movements of the associated valve than between the movements of the valve and of the second angle marking of the camshaft. The first angle of rotation $\alpha$ can be determined with greater accuracy with the method according to the invention than through detection of the second angle marking of the camshaft, particularly if several component tolerances have a less pronounced impact. Preferably, tolerances of the camshaft and of its second angle marking can be eliminated. As a result, required or intended control times can be better adhered to and the underlying object achieved.

According to a preferred development, which can be advantageously combined with one of the abovementioned developments, the actuator device has a first coupling element that is designed to intermittently load the sliding cam device with a force component substantially parallel to the rotational axis A, which is designed to change position, particularly to move translationally or to rotate, particularly in relation to a second longitudinal axis B of the actuator device, and has a drive element that is designed to intermittently load the coupling element with a force component substantially perpendicular to the rotational axis A.

Preferably, the first coupling element device is embodied with a machine element, especially preferably with a projection, pin, bolt, pin-shaped portion, finger, roller, rotor, lever or rotating lever. Preferably, the first coupling element is embodied with a metal. Preferably, the first coupling element has a wear-reducing or friction-reducing coating in some portions. Preferably, the first coupling element is designed particularly to contact the sliding cam device or its peripheral extension portion in a form-fitting manner. Preferably, the first coupling element is embodied with or connectable to a Hall sensor. Preferably, the first coupling element is reversibly displaceable substantially parallel to the second longitudinal axis B. Alternatively, the first coupling element is designed so as to reversibly rotate about the second longitudinal axis B.

Preferably, the drive element is designed to apply force mechanically, especially preferably electromagnetically, electrostatically or inductively, to the first coupling element. Preferably, the drive element is embodied with an electrical coil, the coil being especially preferably capable of receiving the first coupling element at least partially. Preferably, the drive element or the coil, especially preferably during step S1, can be fed current, especially preferably in order to initiate the first state change of the first coupling element or the displacement thereof. Preferably, the drive element or the coil, especially preferably during step S2, can be used to monitor a change of position of the first coupling element, particularly in a currentless manner.

This preferred development can particularly offer the advantage that the first coupling element can be adapted to the installation space available in the region of the cylinder head, to the operating temperatures, to the material of the sliding cam device, to the speeds of the camshaft and/or to the opposing forces between the sliding cam device under the camshaft. This preferred development can particularly offer the advantage that the drive element can be used for the contactless actuation of or application of force to the first coupling element. This preferred development can particularly offer the advantage that the drive element can be used for the contactless detection of a change of position or second state change of the first coupling element.

According to a preferred development, which can be advantageously combined with one of the abovementioned developments, the second measuring device is designed so as to detect the second state change or change of position electromagnetically, inductively, electrostatically, capacitatively or optoelectronically, and/or it is integrally formed with the drive element, and/or it is embodied with a Hall sensor. This preferred development can particularly offer the advantage that the detection of the second state change or change of position of the actuator device can occur in a substantially contactless manner. This preferred development can particularly offer the advantage that the detected state change or change of position of the actuator device can be further processed electrically.

According to a preferred development, which can be advantageously combined with one of the abovementioned developments, the arrangement has a first measuring device that is embodied with an electromagnetic, inductive, electrostatic, capacitative or optoelectronic sensor, that is designed to detect the second angle of rotation $\beta$, the third angle of rotation $\epsilon$ or the fourth angle of rotation $\zeta$, and that is preferably embodied with an ohmic sensor, inductive sensor, capacitative sensor, Hall sensor or with an optoelectronic sensor. Preferably, the first measuring device is used to detect an angle marking that is connected in a rotationally fixed manner to the sliding cam device, the camshaft or the crankshaft. This preferred development can particularly offer the advantage that the first angle of rotation $\alpha$ can be compared to another detected angle of rotation of the reciprocating piston engine. This preferred development can particularly offer the advantage that a defect of the arrangement for monitoring the actuator device, particularly a defect of the second measuring device, can be noticed more easily.

According to a preferred development, which can be advantageously combined with one of the abovementioned developments, the arrangement has one of these first angle measuring devices that is connected to the camshaft in a rotationally fixed manner and is designed to detect the third angle of rotation $\epsilon$ of the camshaft. A combination of a second angle marking that is connected to the camshaft in a rotationally fixed manner and a sensor for detecting this second angle marking that is stationary with respect to the rotating camshaft is also regarded as a first angle measuring device in terms of the invention. This preferred development can particularly offer the advantage that the first angle of rotation $\alpha$ can be compared to another detected angle of rotation of the reciprocating piston engine. This preferred development can particularly offer the advantage that a defect of the arrangement for monitoring the actuator device, particularly a defect of the second measuring device, can be noticed more easily.

According to a preferred development, which can be advantageously combined with one of the abovementioned developments, the arrangement has one of these second angle measuring devices that is connected to the crankshaft in a rotationally fixed manner and is designed to detect the fourth angle of rotation $\zeta$. A combination of an angle marking that is connected to the crankshaft in a rotationally fixed manner and a sensor for detecting this angle marking that is stationary with respect to the rotating camshaft is also regarded as a second angle measuring device in terms of the invention. This preferred development can particularly offer the advantage that the first angle of rotation $\alpha$ can be compared to another detected angle of rotation of the reciprocating piston engine. This preferred development can particularly offer the advantage that a defect of the arrangement for monitoring the actuator device, particularly a defect of the second measuring device, can be noticed more easily.

According to a preferred development, which can be advantageously combined with one of the abovementioned developments, the sliding cam device has on a circumferential surface a guide groove arrangement with at least one, two or more guide grooves, the guide groove arrangement being designed to intermittently guide the actuator device or the first coupling element thereof substantially in the manner of a slotted guide, the guide groove arrangement being embodied with the peripheral extension portion, and the guide groove arrangement preferably having two intersecting guide grooves.

Preferably, at least one of the guide grooves of the guide groove arrangement has one of these peripheral extension portions. Preferably, at least one of the guide grooves of the guide groove arrangement extends along at least a portion of the circumferential surface of the sliding cam device. Preferably, the guide groove arrangement is embodied with two intersecting guide grooves according to DE 10 2012 012 064.

This preferred development can particularly offer the advantage that the force transmission between the actuator device and the sliding cam device is improved. This preferred development can particularly offer the advantage that the displacement of the sliding cam device is reliable at higher camshaft speeds. This preferred development can particularly offer the advantage that the second state change of or application of force to the actuator device can occur through the bottom surface of one of the guide grooves of the guide groove arrangement.

According to a preferred development, which can be advantageously combined with one of the abovementioned developments, the arrangement has an adjustment mechanism that is designed to set an angle-of-rotation position of the camshaft relative to the crankshaft, and with a control device that is designed to control the adjustment mechanism on the basis of the second state change, the change of position of the actuator device, the first differential angle $\gamma_1$, the second differential angle $\gamma_2$ or the third differential angle $\gamma_3$, preferably to set the angle-of-rotation position.

Preferably, the adjustment mechanism is disposed between a drive wheel, particularly embodied as a gearwheel, belt pulley or sprocket, which can be driven at least indirectly by the crankshaft, and the camshaft. The adjustment mechanism is designed to reversibly rotate the drive wheel in relation to the camshaft.

This preferred development can particularly offer the advantage that, by adjusting the angle-of-rotation position to tolerances of the components of the valve drive, it is possible to react to manufacturing tolerances or play between the crankshaft and the camshaft. This preferred development can particularly offer the advantage that a difference between an actual control time and the required or intended control time can be reduced.

According to a third aspect of the invention, the reciprocating piston engine has one of these arrangements according to the second aspect or one of the preferred developments thereof.

To achieve the advantages of a certain cyclic process or combustion process, it is especially important that the valve lift curves, particularly the control times thereof, be adhered to. It has been observed that the consumption of a reciprocating piston engine is increased, that is, that the operation thereof is less economical, in the event of a deviation from the required or intended control times.

It is common practice to actuate a valve with a valve drive. A valve drive can have as components a camshaft, a cam follower, a valve-clearance compensation element, and a sliding cam device that bears at least one eccentric cam, is slidable substantially parallel to the rotational axis of the camshaft, and can be caused to rotate by the camshaft. A second angle marking can be non-rotatably fastened to the camshaft and detected by a sensor for the angle of rotation of the camshaft. During the operation of the reciprocating piston engine, it is possible, on the basis of the detected second angle marking and the assumed or graphic geometries of the components of the valve drive, to determine at least one control time of a valve, for example the beginning of the opening of the valve.

However, this valve drive and its components have unavoidable tolerances from the manufacturing process (manufacturing tolerances) and from the operation of the reciprocating piston engine that may be necessary for the proper functioning of the valve drive. As a result, unknown time differences can occur between the control times of a valve that are expected based on the detected second angle marking and the actual control times. It has been observed that tolerances of the component (component tolerances) can combine to bring about a noticeable deviation of the actual control times from the required or intended control times.

With the reciprocating piston engine according to the third aspect, the first angle of rotation $\alpha$ of a camshaft or of the camshaft can be detected on the basis of the second state change of the actuator device. Preferably, the second state change of the actuator device is initiated by the sliding cam device.

A closer mechanical interrelation exists between the state changes or movements of the actuator device and the movements of the associated valve than between the movements of the valve and of the second angle marking of the camshaft. The first angle of rotation $\alpha$ can be determined with greater accuracy with the method according to the invention than through detection of the second angle marking of the camshaft, particularly if several component tolerances have a less pronounced impact. Preferably, tolerances of the camshaft and of its second angle marking can be eliminated. As a result, required or intended control times can be better adhered to and the underlying object achieved.

Additional advantages, features and possible applications of the present invention follow from the following description in conjunction with the figures.

Figure 2:
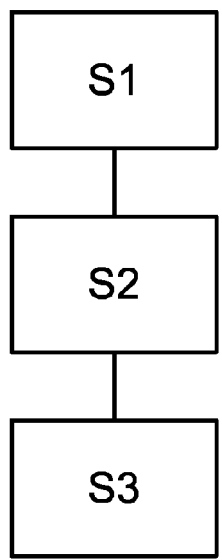
Figure 3:
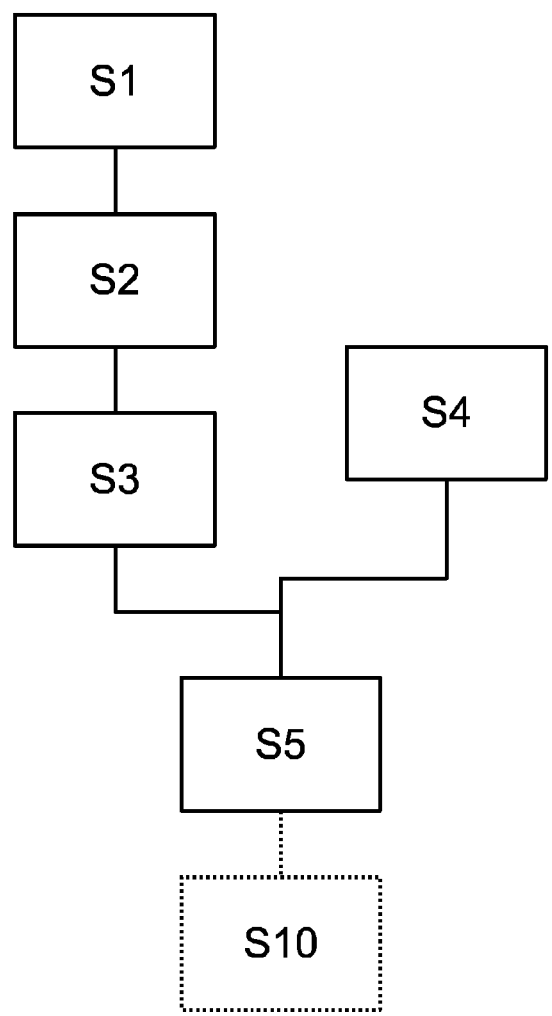
Figure 4:
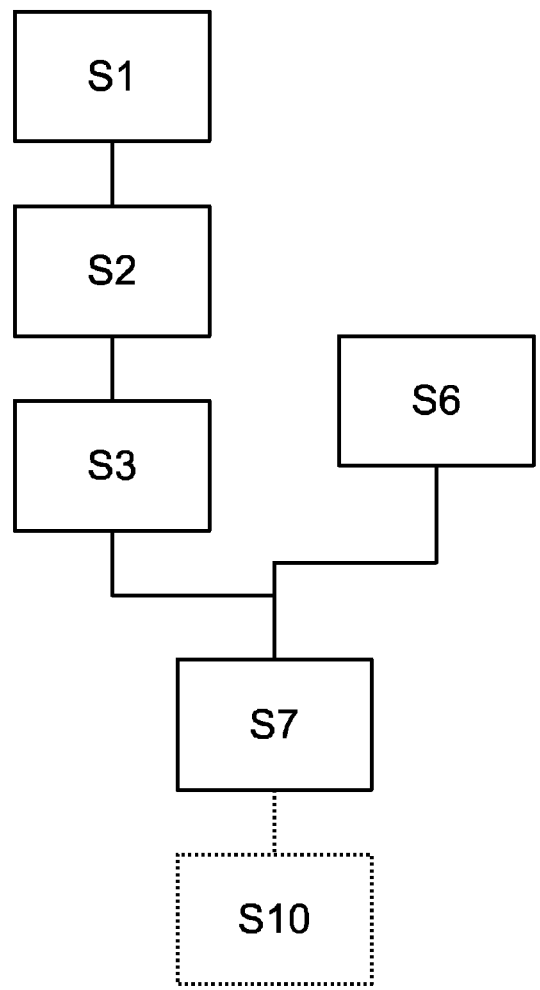
Figure 5:
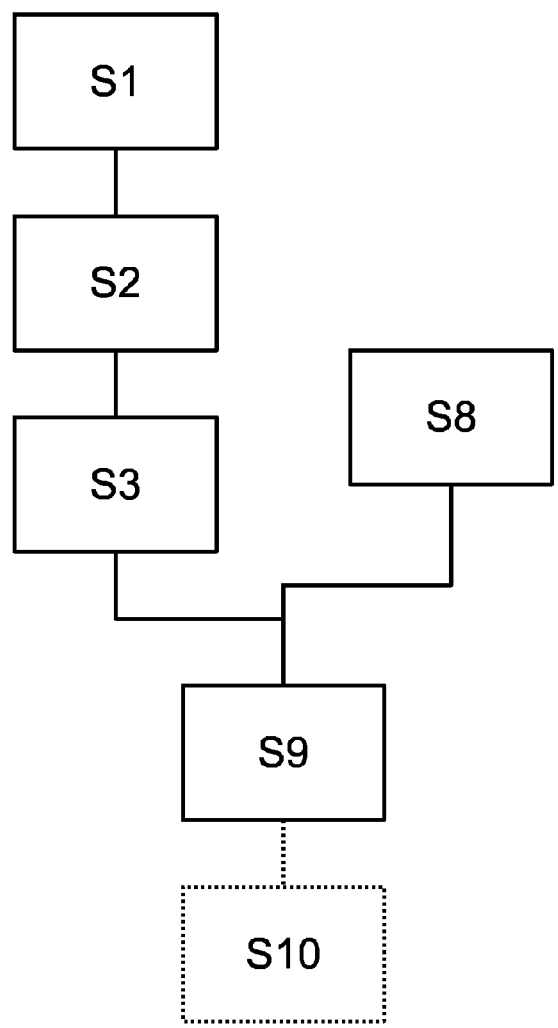
Figure 6:
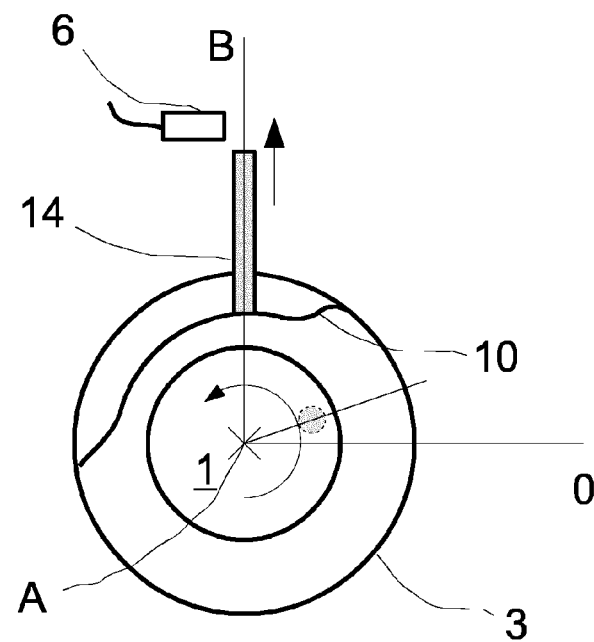
Figure 6:
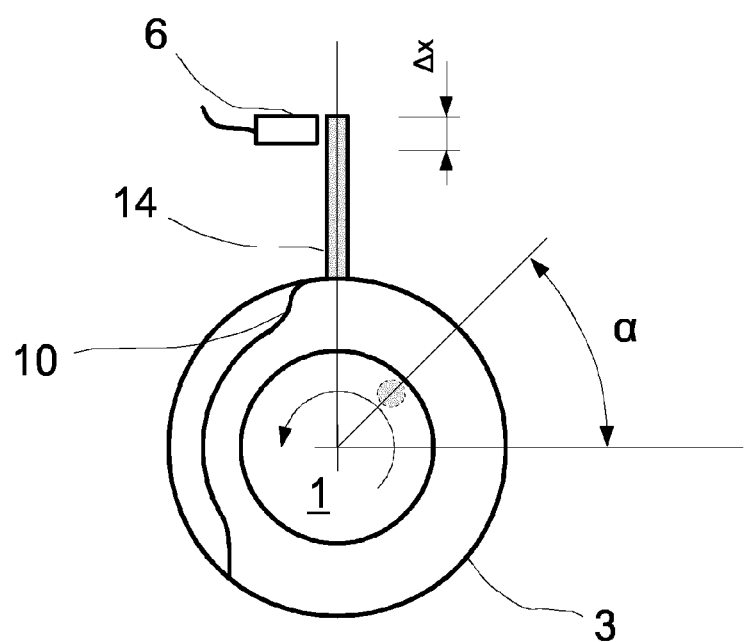
Figure 7:
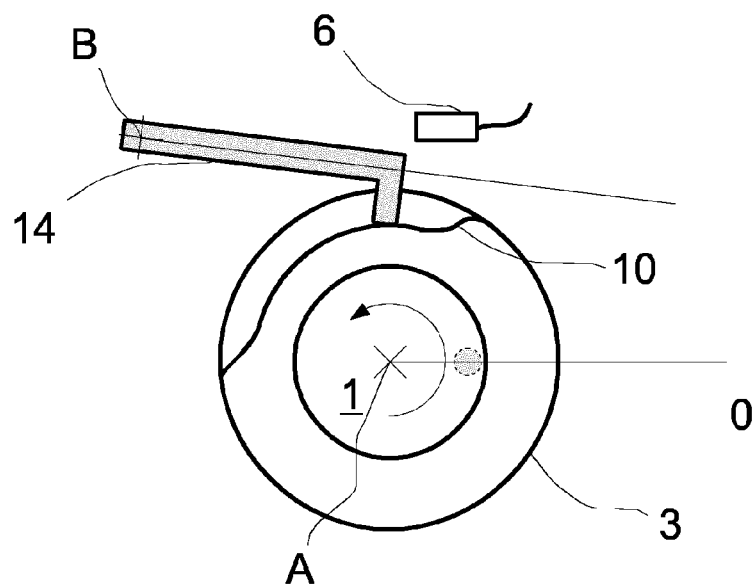
Figure 7:
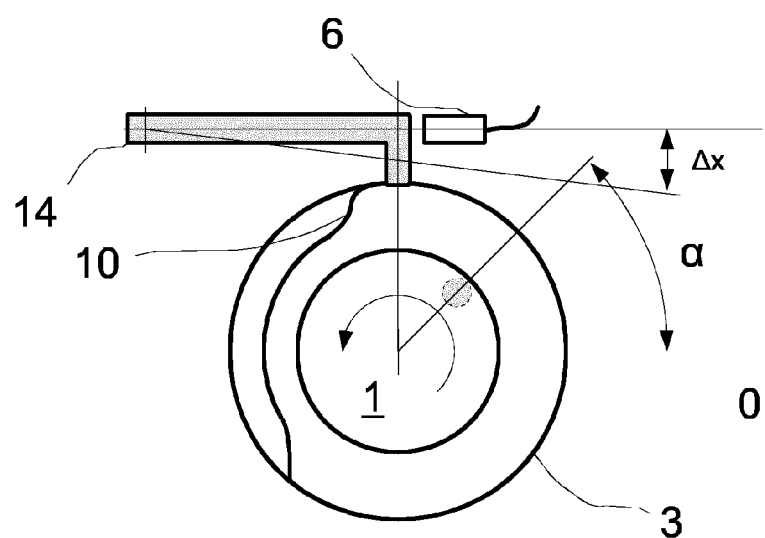
Figure 8:
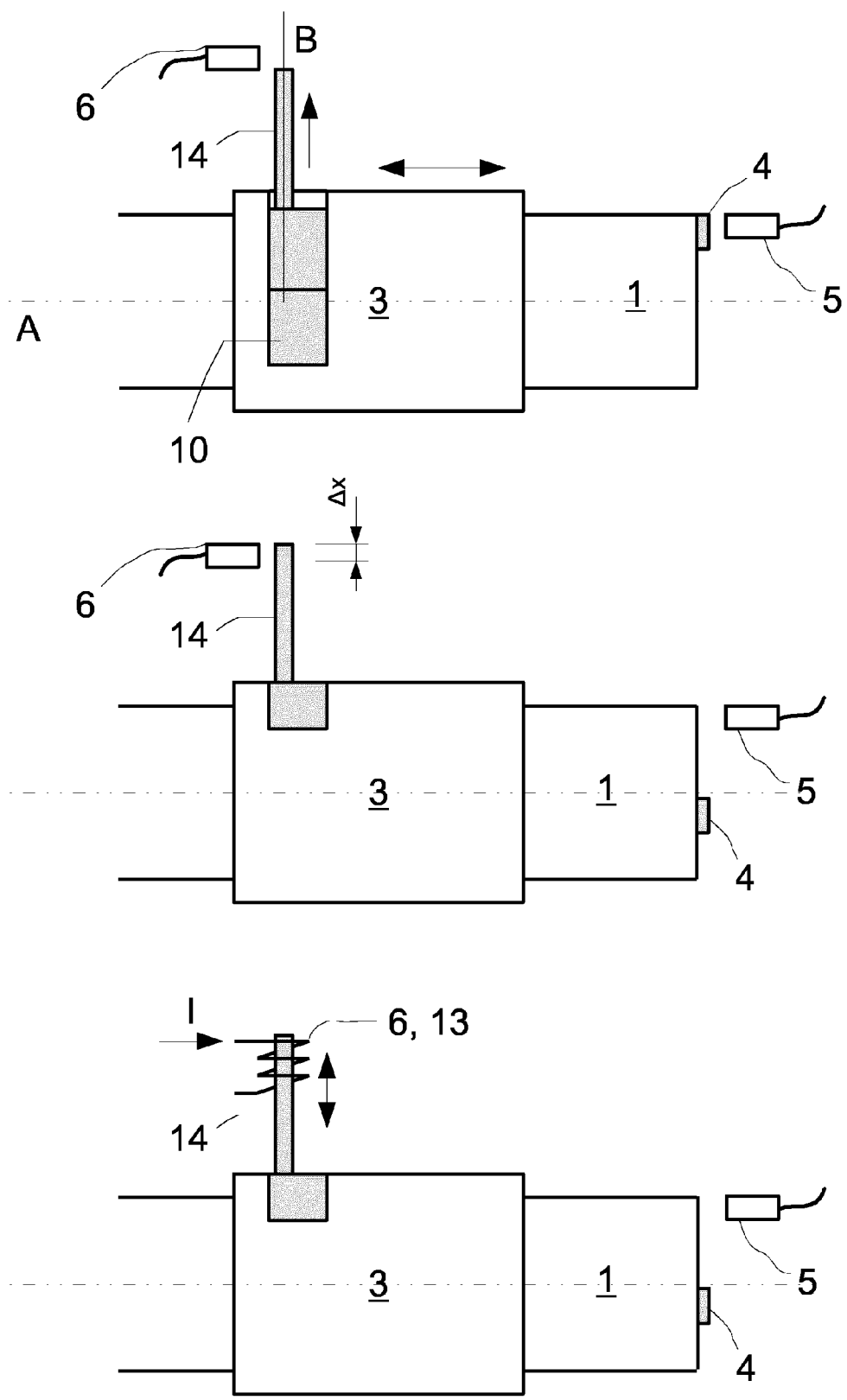
Figure 9:
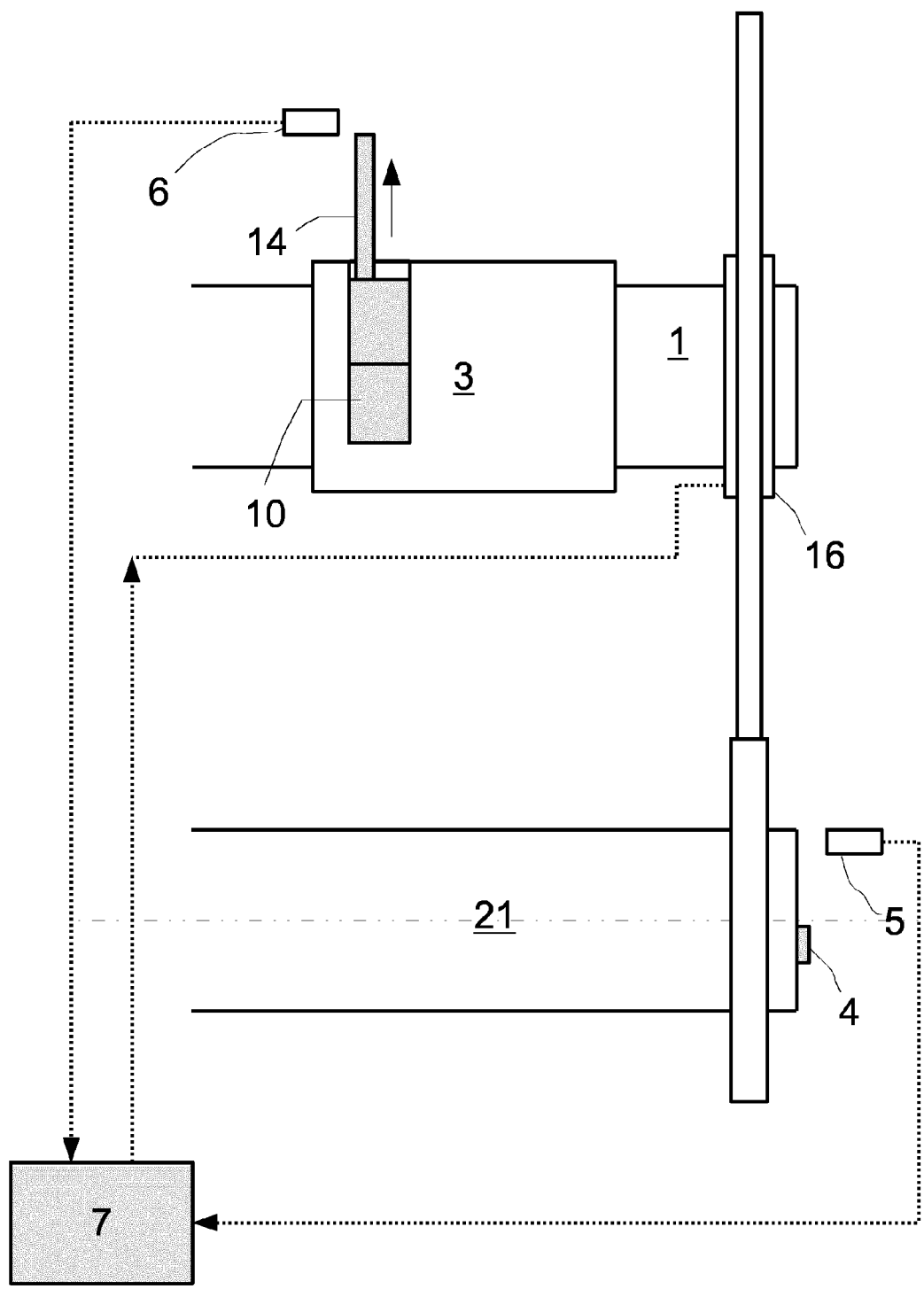

FIG. 1 shows a schematic representation of a section through a camshaft and through a sliding cam device to show different angles, FIG. 2 shows a diagram of the method according to the first aspect of the invention, FIG. 3 shows a diagram of a preferred development of the method according to the first aspect of the invention, FIG. 4 shows a diagram of another preferred development of the method according to the first aspect of the invention, FIG. 5 shows a diagram of another preferred development of the method according to the first aspect of the invention, FIG. 6 shows a schematic representation of an arrangement according to the second aspect of the invention at different points in time, FIG. 7 shows another schematic representation of an arrangement according to the second aspect of the invention at different points in time, FIG. 8 shows a schematic representation of preferred developments of the arrangement according to the invention, FIG. 9 shows a schematic representation of another preferred development of the arrangement according to the invention, FIG. 1 shows a schematic representation of a section through a camshaft 1 and through a sliding cam device 3 to show different angles.

A sliding cam device 3 is embodied here so as to be substantially hollow and cylindrical. A camshaft 1 extends through the hollow space of the sliding cam device 3. However, this design of the sliding cam device 3 is not imperative for the technical effect of the invention.

Starting from a zero beam, which is shown as a horizontal line and marked with "0," the second angle of rotation β of the sliding cam device, the first angle of rotation α of the camshaft 1 determined in step S3, and the measured third angle of rotation ε of the camshaft 1 are shown. The sliding cam device 3 has a first angle marking through which the second leg of the second angle of rotation β passes. It is not imperative that this first angle marking be arranged on a circumferential surface of the sliding cam device 3. The camshaft 1 has a second angle marking—represented by a solid line—through which the second leg of the third angle of rotation ε passes. It is not imperative that this second angle marking be arranged on a front face of the camshaft 1.

A thinner, broken line shows the position of the second angle marking of the camshaft 1 that the second angle marking would ideally assume but that the second angle marking does not assume as a result of a characteristic measure of tolerance of the manufacturing process.

To clarify the fourth angle of rotation ζ, the crankshaft 21 is also shown with its own angle marking that does not, however, belong to the arrangement of the second aspect.

FIG. 2 shows a diagram of the method according to the first aspect of the invention.

During step S1, an actuation energy is fed to the actuator device 14, upon which the actuator device 14 undergoes a first state change. Preferably, the first state change of the actuator device 14 consists in its change of position, particularly in its rotation and/or translation in relation to a second longitudinal axis B of the actuator device 14. Preferably, the first state change of the actuator device 14 initiates a reversible displacement of the sliding cam device 3, particularly substantially parallel to a camshaft 1 of the reciprocating piston engine.

During step S2, the actuator device 14 is monitored and a second state change of the actuator device 14 is detected. Preferably, the second state change of the actuator device 14 consists in the change of position thereof. Preferably, the second state change is initiated by the sliding cam device 3, especially preferably by the peripheral extension portion thereof.

During step S3, the first angle of rotation α of a camshaft or of the camshaft 1 of the reciprocating piston engine is detected on the basis of the second state change of the actuator device 14. Preferably, a predetermined change of position of the actuator device 14 is detected and particularly processed as an indication of the second state change of the actuator device 14.

It is with this method that the underlying object is achieved.

FIG. 3 shows a diagram of a preferred development of the method according to the first aspect of the invention. In addition to steps S1, S2 and S3, steps S4 and S5 are carried out.

During step S4, the second angle of rotation β of the sliding cam device 3 is determined on the basis of the second state change or on the basis of the—particularly predetermined—change of position Δx of the actuator device 14, particularly wherein the apex of the second angle of rotation β lies on the rotational axis A of the camshaft 1.

During step S5, the second angle of rotation β and first angle of rotation α are linked with a first differential angle $\gamma_1$.

Preferably, step S10 follows step S5; during step S10, however, the angle-of-rotation position of the camshaft 1 in relation to the crankshaft 21 is set on the basis of the first differential angle $\gamma_1$, especially preferably by a control device 7.

FIG. 4 shows a diagram of another preferred development of the method according to the first aspect of the invention. In addition to steps S1, S2 and S3, steps S6 and S7 are carried out.

During step S6, the third angle of rotation ε of the camshaft 3 is detected with a first angle measuring device 22.

During step S7, the second angle of rotation β and/or the first angle of rotation α are linked with the third angle of rotation ε at a second differential angle $\gamma_2$.

Preferably, step S10 follows step S7; during step S10, however, the angle-of-rotation position of the camshaft 1 in relation to the crankshaft 21 is set on the basis of the second differential angle $\gamma_2$, especially preferably by a control device 7.

FIG. 5 shows a diagram of another preferred development of the method according to the first aspect of the invention. In addition to steps S1, S2 and S3, steps S8 and S9 are carried out.

During step S8, the fourth angle of rotation ζ of the crankshaft is detected with the second angle measuring device 4.

During step S9, the second angle of rotation β and/or the first angle of rotation α are linked with the fourth angle of rotation ζ, particularly at a third differential angle $\gamma_3$.

Preferably, step S10 follows step S7; during step S10, however, the angle-of-rotation position of the camshaft 1 in relation to the crankshaft 21 is set on the basis of the third differential angle $\gamma_3$, especially preferably by a control device 7.

FIG. 6 shows a schematic representation of an arrangement according to the second aspect of the invention at different points in time. The arrangement has the camshaft 1, the sliding cam device 3, the actuator device 14 and a second measuring device 6, particularly an incremental encoder. The sliding cam device 3 has the peripheral extension portion 10. The actuator device 14 is embodied with a bolt or pin that is designed to move translationally in relation to the longitudinal axis B.

Only for the purpose of clarifying the first angle of rotation α, a second angle marking is shown on the camshaft 1 with a broken line. This second angle marking of the camshaft 1 is not required for the method according to the first aspect and for the arrangement according to the second aspect.

The sliding cam device 3 can be displaced substantially parallel to the rotational axis A, which extends substantially perpendicular to the drawing plane. The sliding cam device 3 can preferably be connected to the camshaft 1 in a frictional and/or force-fitting manner. The camshaft 1 is designed to intermittently drive the sliding cam device 3 such that it rotates.

The arrangement following step S1 is shown in the upper half of FIG. 6. As the sliding cam device 3 continues to rotate, the actuator device 14 is to be loaded by the sliding cam device 3 with a force component along the arrow drawn next to the actuator device 14. In the arrangement illustrated in the upper half of FIG. 6, the actuator device 14 is currently being monitored.

The arrangement following step S2 is shown in the lower half of FIG. 6. The camshaft 1 and the sliding cam device 3 have rotated together a few degrees around the rotational axis A. The actuator device 14 has been displaced by the distance Δx. For the method according to the first aspect and the arrangement according to the second aspect, it is sufficient for the predetermined change of position Δx to be only a few millimeters or degrees or even only fractions thereof.

The second measuring device 6 has detected the second state change of the actuator device 14 as a change of position. The first angle of rotation α has been determined from the predetermined change of position Δx and from the second state change of the actuator device 14.

FIG. 7 shows a schematic representation of another arrangement according to the second aspect of the invention at different points in time. Unlike in FIG. 6, the actuator device 14 is embodied with a lever that can rotate about the second longitudinal axis B. In this embodiment, the change of position Δx of the actuator device 14, which is to be regarded as an indication of its second state change, occurs as a rotation about the second longitudinal axis B.

In the lower half of FIG. 7, the second state change of the actuator device 14 has been detected by the second measuring device 6. Moreover, the first angle of rotation α has been determined on the basis of the second state change.

FIG. 8 shows a schematic representation of preferred developments of the arrangement according to the invention. In deviation from FIG. 6, what these developments have in common is that the angle measuring device for detecting the angle of rotation ε of the camshaft is embodied with a second angle marking 4 and a sensor 5. The second angle marking 4 is connected in a rotationally fixed manner to the front face of the camshaft 1.

The two upper illustrations (FIGS. 8a, 8b) correspond substantially to the preferred development according to FIG. 6. The peripheral extension portion 10 of the sliding cam device 3 is marked in the uppermost illustration (FIG. 8a).

Unlike in FIG. 6, in the lower illustration (FIG. 8c), the actuator device is embodied with the first coupling element 14 and the drive element 13. The second measuring device 6 is embodied with an electrical coil and is integrally formed with the drive element 13. Preferably, the electrical coil 13 can be intermittently traversed by a current, especially preferably when the actuator device 14 is to be loaded with a force component substantially radially to the rotational axis A. Preferably, a current can be induced intermittently in the electrical coil 13, especially preferably when the first coupling element 14 penetrates more deeply into the coil 13.

FIG. 9 shows a schematic representation of another preferred development of the arrangement according to the invention. Compared to the embodiment according to FIG. 6, the following are additionally depicted: the crankshaft 21, an angle measuring device 4, 5 for detecting the fourth angle of rotation ζ, drive device with which the crankshaft 21 can drive the camshaft 1 here, the control device 7 and the adjustment mechanism 16. An angle marking 4 is connected in a rotationally fixed manner to the front face of the crankshaft 21. A first measuring device 5 is used to detect the angle marking 4.

The control device 7 can receive and process signals of the second measuring device 6 as well as of the first measuring device 5. The control device 7 can link together the signals of the first measuring device 5 and second measuring device 6, particularly at a differential angle γ. The control device 7 can control the adjustment mechanism 16 on the basis of the differential angle γ. For this purpose, the control device 7 is signal-connected to the first measuring device 5, the second measuring device 6 and the adjustment mechanism 16, as is shown by the dashed signal lines.

REFERENCE SYMBOLS 1 camshaft
2 first angle marking of the sliding cam device
3 sliding cam device
4 second angle marking of the camshaft
5 first measuring device
6 second measuring device
7 first control device
9 sensor
10 peripheral extension portion
13 drive element
14 actuator device
15 guide groove arrangement
16 adjustment mechanism
21 crankshaft
22, 22a angle measuring device
α first angle of rotation
β second angle of rotation $\gamma_1$, $\gamma_2$, $\gamma_3$ differential angles
ε third angle of rotation of the camshaft, measured
ζ fourth angle of rotation of the crankshaft
A rotational axis of the camshaft
B second longitudinal axis of the actuator device
x position of the actuator device and of the first coupling element
Δx change of position of the actuator device and of the first coupling element

The invention claimed is:

1. A method for determining an angle of rotation of a camshaft of a reciprocating piston engine, comprising:
   providing the reciprocating piston engine with an actuator device, the camshaft, and a sliding cam device positioned substantially parallel to the camshaft, wherein the actuator device actuates by reversibly displacing the sliding cam device of the reciprocating piston engine,
   feeding of actuation energy to the actuator device, whereupon the actuator device undergoes a first state change,
   monitoring of the actuator device,
   detecting a second state change of the actuator device,
   determining of a first angle of rotation a of the camshaft of the reciprocating piston engine on the basis of the second state change of the actuator device,
   determining of a second angle of rotation β of the sliding cam device on the basis of the second state change or on the basis of a predetermined change of position of the actuator device, wherein an apex of the second angle of rotation β lies on a rotational axis (A) of the camshaft, and
   linking of the second angle of rotation β and first angle of rotation a at a first differential angle $\gamma_1$.

2. The method as set forth in claim 1, wherein at least one of the following is true:
   the actuation energy is fed in electromagnetically, inductively or electrostatically,
   the second state change is detected electromagnetically, inductively, electrostatically, capacitatively or opto-electronically,
   the second state change is detected as a change of position of the actuator device, wherein the change of position is a translational movement or rotation in relation to a second longitudinal axis (B), and
   the first angle of rotation a is determined on the basis of the predetermined change of position of the actuator device.

3. The method as set forth in claim 1, wherein the camshaft has an adjustment mechanism that is designed to set an angle-of-rotation position of the camshaft relative to a crankshaft, further comprising:
   setting of the angle-of-rotation position on the basis of the first differential angle $\gamma_1$, a second differential angle $\gamma_2$, or a third differential angle $\gamma_3$.

4. An arrangement for monitoring an actuator device of a reciprocating piston engine, wherein the arrangement comprises:
- a camshaft that can rotate about a rotational axis (A),
- a sliding cam device that can be displaced substantially parallel to the rotational axis (A) and has a peripheral extension portion on a circumferential surface,
- an actuator device that is designed to actuate or displace the sliding cam device and can undergo a second state change,
- a second measuring device that is designed to detect the second state change and is capable of determining a first angle of rotation α of the camshaft on the basis of the second state change, and
- the peripheral extension portion being designed to load the actuator device with at least one force component outwardly directed and radial to the rotational axis (A).

5. The arrangement as set forth in claim 4, wherein the actuator device has:
- a first coupling element that is designed to intermittently load the sliding cam device with a force component substantially parallel to the rotational axis (A), which is designed for a change of position via a translational movement or a rotation in relation to a second longitudinal axis (B) of the actuator device, and
- a drive element that is designed to intermittently load the first coupling element with a force component substantially perpendicular to the rotational axis (A).

6. The arrangement as set forth in claim 4, wherein the second measuring device is designed to detect the second state change or change of position electromagnetically, inductively, electrostatically, capacitatively or optoelectronically, and wherein at least one of the following is true:
- is integrally formed with the drive element, and
- is embodied with a Hall sensor.

7. The arrangement as set forth in claim 4, further comprising at least one of the following:
- a first measuring device, wherein the first measuring device:
  - is embodied with an electromagnetic, inductive, electrostatic, capacitative or optoelectronic sensor,
  - is designed to detect a second angle of rotation β, a third angle of rotation ε or a fourth angle of rotation ζ,
  - is embodied with an ohmic sensor, inductive sensor, capacitative sensor, Hall sensor or with an optoelectronic sensor, and
  - is an incremental encoder,
- a first angle measuring device, which is connected in a rotationally fixed manner to the camshaft, which is designed to detect the third angle of rotation ε, and
- a second angle measuring device, which is connected in a rotationally fixed manner to the crankshaft, which is designed to detect the fourth angle of rotation ζ.

8. The arrangement as set forth in claim 4, wherein the sliding cam device has on a circumferential surface a guide groove arrangement with at least one guide groove, the guide groove arrangement being designed to guide the actuator device or the first coupling element thereof intermittently substantially in the manner of a slotted guide, the guide groove arrangement being embodied with the peripheral extension portion, and the guide groove arrangement having two intersecting guide grooves.

9. The arrangement as set forth in claim 4, with an adjustment mechanism that is designed to set an angle-of-rotation position of the camshaft relative to the crankshaft, and with a control device that is designed to control the adjustment mechanism on the basis of the second state change, the change of position of the actuator device, the first differential angle $\gamma_1$, the second differential angle $\gamma_2$ or the third differential angle $\gamma_3$.

10. A reciprocating piston engine with an arrangement as set forth in claim 4.

11. A computer program containing instructions, wherein the instructions, when they are carried out by a control device, cause the control device to execute a method as set forth in claim 1.

12. A computer-readable medium, on which a computer program as set forth in claim 11 is stored.

13. A method for determining an angle of rotation of a camshaft of a reciprocating piston engine, comprising:
- providing the reciprocating piston engine with an actuator device, the camshaft, and a sliding cam device positioned substantially parallel to the camshaft, wherein the actuator device actuates by reversibly displacing the sliding cam device of the reciprocating piston engine,
- feeding of actuation energy to the actuator device, whereupon the actuator device undergoes a first state change,
- monitoring of the actuator device,
- detecting a second state change of the actuator device,
- determining of a first angle of rotation α of the camshaft of the reciprocating piston engine on the basis of the second state change of the actuator device, wherein the camshaft is connected in a rotationally fixed manner to a first angle measuring device,
- detecting of a third angle of rotation ε of the camshaft with the first angle measuring device, and
- linking of the first angle of rotation α with the third angle of rotation ε at a second differential angle $\gamma_2$.

14. The method as set forth in claim 13, wherein at least one of the following is true:
- the actuation energy is fed in electromagnetically, inductively or electrostatically,
- the second state change is detected electromagnetically, inductively, electrostatically, capacitatively or optoelectronically,
- the second state change is detected as a change of position of the actuator device, wherein the change of position is a translational movement or rotation in relation to a second longitudinal axis (B), and
- the first angle of rotation α is determined on the basis of a predetermined change of position of the actuator device.

15. The method as set forth in claim 13, wherein the camshaft has an adjustment mechanism that is designed to set an angle-of-rotation position of the camshaft relative to a crankshaft, further comprising:
- setting of the angle-of-rotation position on the basis of a first differential angle $\gamma_1$, the second differential angle $\gamma_2$, or a third differential angle $\gamma_3$.

16. A method for determining an angle of rotation of a camshaft of a reciprocating piston engine, comprising:
- providing the reciprocating piston engine with an actuator device, the camshaft, and a sliding cam device positioned substantially parallel to the camshaft, wherein the actuator device actuates by reversibly displacing the sliding cam device of the reciprocating piston engine,
- feeding of actuation energy to the actuator device, whereupon the actuator device undergoes a first state change,
- monitoring of the actuator device,
- detecting a second state change of the actuator device,
- determining of a first angle of rotation a of the camshaft of the reciprocating piston engine on the basis of the second state change of the actuator device, wherein a crankshaft of the reciprocating piston engine is connected in a rotationally fixed manner to a second angle measuring device, detecting of a fourth angle of rotation $\zeta$ of the crankshaft with the second angle measuring device, and linking of the first angle of rotation $\alpha$ with the fourth angle of rotation $\zeta$ at a third differential angle $\gamma_3$.

17. The method as set forth in claim 16, wherein at least one of the following is true:

the actuation energy is fed in electromagnetically, inductively or electrostatically, the second state change is detected electromagnetically, inductively, electrostatically, capacitatively or optoelectronically, the second state change is detected as a change of position of the actuator device, wherein the change of position is a translational movement or rotation in relation to a second longitudinal axis (B), and the first angle of rotation $\alpha$ is determined on the basis of a predetermined change of position of the actuator device.

18. The method as set forth in claim 16, wherein the camshaft has an adjustment mechanism that is designed to set an angle-of-rotation position of the camshaft relative to the crankshaft, further comprising:

setting of the angle-of-rotation position on the basis of a first differential angle $\gamma_1$, a second differential angle $\gamma_2$, or the third differential angle $\gamma_3$.

* * * * *

UNITED STATES PATENT AND TRADEMARK OFFICE
CERTIFICATE OF CORRECTION

| | | |
|---|---|---|
| PATENT NO. | : 10,012,116 B2 | Page 1 of 1 |
| APPLICATION NO. | : 15/032110 | |
| DATED | : July 3, 2018 | |
| INVENTOR(S) | : Max Nestoriuc | |

It is certified that error appears in the above-identified patent and that said Letters Patent is hereby corrected as shown below:

In the Claims

Column 16, Line 36, Claim 1:
After "rotation" delete "a" and insert --$\alpha$--.

Column 16, Line 46, Claim 1:
After "rotation" delete "a" and insert --$\alpha$--.

Column 16, Line 58, Claim 2:
After "rotation" delete "a" and insert --$\alpha$--.

Column 18, Line 65, Claim 16:
After "rotation" delete "a" and insert --$\alpha$--.

Signed and Sealed this
Sixth Day of November, 2018

Andrei Iancu
*Director of the United States Patent and Trademark Office*